(12) United States Patent
Byun et al.

(10) Patent No.: US 8,741,505 B2
(45) Date of Patent: Jun. 3, 2014

(54) DEVICE AND METHOD FOR STACKING FUEL CELL STACK

(71) Applicant: Hyundai Motor Company, Seoul (KR)

(72) Inventors: Jung Yeon Byun, Gyeonggi-Do (KR); Sung Bum Choi, Gyeonggi-Do (KR); Jong Hyun Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/683,059

(22) Filed: Nov. 21, 2012

(65) Prior Publication Data

US 2014/0057198 A1    Feb. 27, 2014

(30) Foreign Application Priority Data

Aug. 21, 2012  (KR) .......................... 10-2012-0091065

(51) Int. Cl.
*H01M 8/00*           (2006.01)
(52) U.S. Cl.
USPC ........................................................ 429/535

(58) Field of Classification Search
None
See application file for complete search history.

(56) References Cited

FOREIGN PATENT DOCUMENTS

| JP | 2009-205919 A | 9/2009 |
|----|---|---|
| KR | 10-2004-0007766 | 1/2004 |
| KR | 10-0828677 B1 | 5/2008 |
| KR | 10-2009-0108477 | 10/2009 |
| KR | 1020110019274 A | 2/2011 |
| KR | 1020120061282 A | 6/2012 |

*Primary Examiner* — Cynthia K. Walls
(74) *Attorney, Agent, or Firm* — Edwards Wildman Palmer LLP; Peter F. Corless

(57) ABSTRACT

Disclosed is a device and method for stacking a fuel cell stack, which enables automated accurate stacking of components constituting the fuel cell stack by using a phosphor coated thereon. Accordingly, when a membrane-electrode assembly (MEA), a separation plate, etc. are automatically stacked in sequence they are coated with phosphor at a predetermined position on each of the MEA, the separation plate, etc. A phosphor sensor is then positioned and configured to automatically determine whether or not the MEA and separator have been accurately stacked by detecting the presence of phosphor on the stacked MEA and separator plate respectively.

5 Claims, 3 Drawing Sheets

US 8,741,505 B2

DEVICE AND METHOD FOR STACKING FUEL CELL STACK

CROSS-REFERENCE TO RELATED APPLICATION

This application claims under 35 U.S.C. §119(a) the benefit of Korean Patent Application No, 10-2012-0091065 filed Aug. 21, 2012, the entire contents of which are incorporated herein by reference.

BACKGROUND (a) Technical Field

The present invention relates to a device and method for stacking a fuel cell stack. More particularly, the present invention relates to a device and method for stacking a fuel cell stack, which enables the stacking state of components constituting the fuel cell stack to be accurately stacked using a phosphor.

(b) Background Art

A fuel cell stack is a power generating device that generates electricity via an electrochemical reaction. Recently, fuel cells have been used to provide the main source of power to vehicles as part of the vehicles drive train. A fuel cell stack has a structure in which an anode to which hydrogen is supplied and a cathode to which air is supplied are stacked with a membrane-electrode assembly interposed therebetween. The fuel cell stack refers to a device that generates electrical energy through a chemical reaction of oxygen in the air and the hydrogen supplied from the outside thereof.

A fuel cell stack is often assembled by stacking a few tens to a few hundreds of unit cells. Hereinafter, the configuration of one unit cell will be described with reference to FIG. 3.

First, a membrane-electrode assembly (MBA) is positioned at the innermost side of the unit cell. The MEA includes a polymer electrolyte membrane 10 that enables hydrogen protons to move therethrough, and catalyst layers, i.e., a cathode 12 and an anode 14, respectively coated on both surfaces of the electrolyte membrane 10 so that hydrogen and oxygen can react to each other.

Gas diffusion layers (GDLs) 16 are then stacked on outsides of the MEA, i.e., sides at which the cathode 12 and the anode 14 are positioned, respectively. A separation plate 20 having a flow field formed therein is positioned on an outside surface of the GDL 16 with a gasket 18 interposed therebetween. Here, the flow field is used to supply fuel and to discharge water produced by a reaction therein. An end plate 30 for supporting and fixing the components described above is coupled to the unit cell at the outermost side of the unit cell.

Thus, in the anode 14 of the fuel cell stack, hydrogen protons and electrons are generated through an oxidation reaction of hydrogen. In this case, the generated hydrogen protons and electrons are moved to the cathode 12 through the electrolyte membrane 10 and the separation plate 20, respectively. In the cathode 12 of the fuel cell stack, water is produced through an electrochemical reaction of the hydrogen protons and electrodes are moved from the anode 14 and oxygen in air, and simultaneously, electric energy is generated through the flow of electrons therebetween.

As described above, the fuel cell stack is configured by stacking a few hundred of separation plates, MEAs, etc. If the stacking state of the fuel cell stack is not exactly determined, a leakage of reaction gas and deterioration of cell performance may result.

To solve such problems, a method has conventionally been used in which a separate guide line is applied to a separation plate so that gas and coolant flow fields of an MEA are exactly corresponded to manifolds of the separation plate, respectively, during the stacking of the MEA and the separation plate. However, excessive guide lines may cause crumpling and folding of a thin MEA during the stacking of the MEA.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. Accordingly, the present invention provides a device and method for stacking a fuel cell stack, in which when a membrane-electrode assembly (MBA), a separation plate, etc., are automatically stacked in sequence by coating a phosphor at a predetermined position on each of the MEA, the separation plate, etc., the operation of sensing the phosphor in a phosphor sensor is automatically performed, so that the stacking of the MEA, the separation plate, etc., can be accurately executed.

In one aspect, the present invention provides a device for stacking a fuel cell stack, including: a phosphor coated at a predetermined position on an MEA and a separation plate, stacked on each other. The device also may include a phosphor sensor that senses the phosphor. The phosphor may be disposed at an upper peripheral position of the MEA and the separation plate; and a controller configured to determine whether the stacking state of the MEA and the separation plate is satisfactory or unsatisfactory, based on whether or not the phosphor sensor has sensed phosphor at the predetermine positions on the MEA and the separation plate.

In some exemplary embodiments, the phosphor may preferably be coated at a corner position in a diagonal direction of the MEA and a corner position in a diagonal direction of the separation plate.

In another exemplary embodiment, the phosphor may be formed at a peripheral position of gas and coolant flow fields of the MEA and a peripheral position of gas and coolant manifolds of the separation plate.

In another aspect, the present invention provides a method for stacking a fuel cell stack, including: coating phosphor at a corner position in the diagonal direction of an MEA while punching gas and coolant flow fields of the MEA; coating phosphor at a corner position in the diagonal direction of a separation plate while punching gas and coolant manifolds of the separation plate; and determining, by a controller, whether the MEA and the separation plate have been stacked in a satisfactory manner, when a phosphor sensor senses the phosphor on the MEA and separator plate at the corner positions.

In some exemplary embodiments, the method may further providing a warning from the controller that the MEA and the separator plate have not been stacked in a satisfactory manner when the phosphor sensor does not sense the phosphor at the corner positions.

Advantageously, when an MEA, a separation plate, etc. are automatically stacked in sequence by coating a phosphor at a predetermined position on each of the MEA, the separation plate, etc., the operation of sensing the phosphor in a phosphor sensor is automatically performed, so that the stacking of the MEA, the separation plate, etc., can be executed efficiently and accurately.

Particularly, as the MBA, the separation plate, etc. are accurately stacked together, the gas and coolant flow fields of the MEA and the gas and coolant manifolds of the separation plate precisely associated to correspond with each other, so that the airtightness by the gasket can be easily made and the flow fields are not blocked. Accordingly, it is possible to reduce the risk of leakage of the gas and coolant provided to the fuel cell stack and to implement uniform stack performance.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
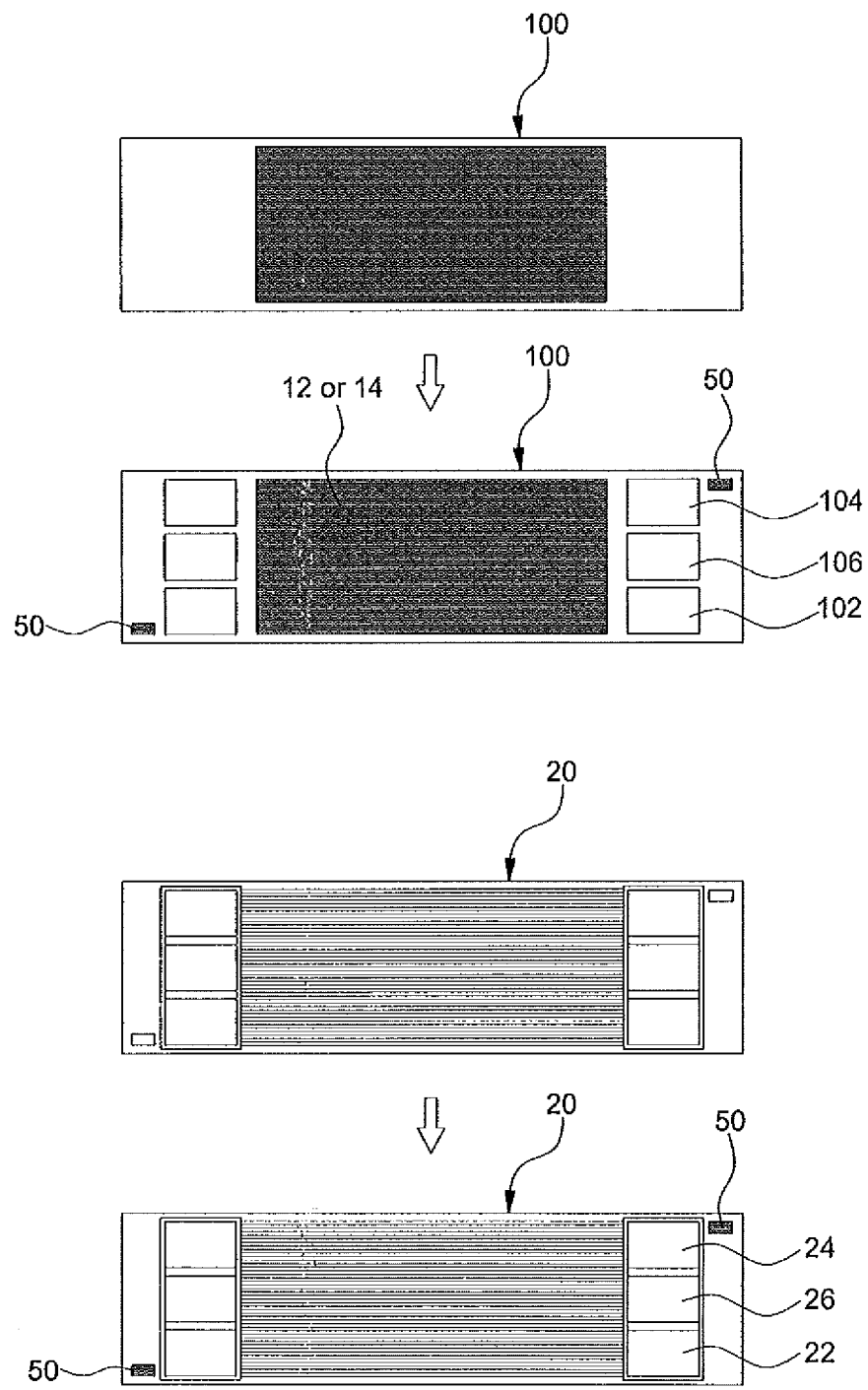
FIG. 1 is a schematic view illustrating a state in which a phosphor is coated on a membrane-electrode assembly (MEA) and a separation plate in a device for stacking a fuel cell stack according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and, other embodiments, which may be included within the spirit and scope of the invention as defined by the appended claims.

The present invention relates to a device and method for stacking a fuel cell stack, which enables components such as a membrane-electrode assembly (MEA) and a separation plate to be exactly stacked when the fuel cell stack is assembled by stacking a few tens to a few hundreds of unit cells.

Figure 2:
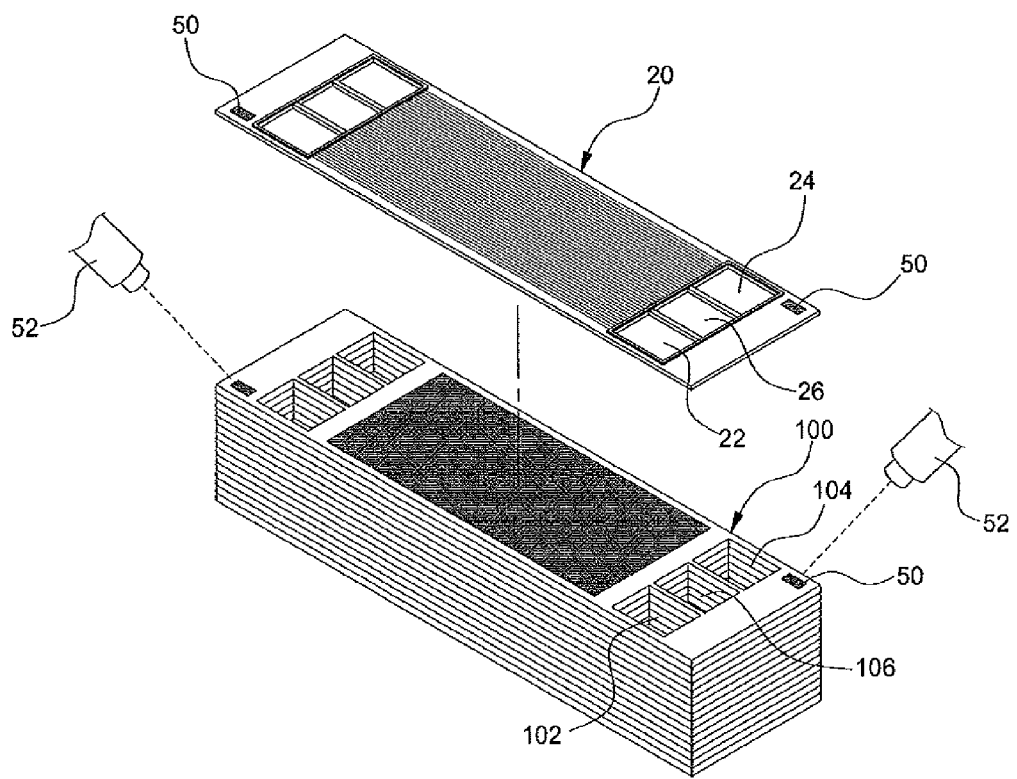
FIG. 2 is a schematic view illustrating a state in which the MEA and the separation plate are stacked in the device for stacking the fuel cell stack according to the exemplary embodiment of the present invention.
Figure 3:
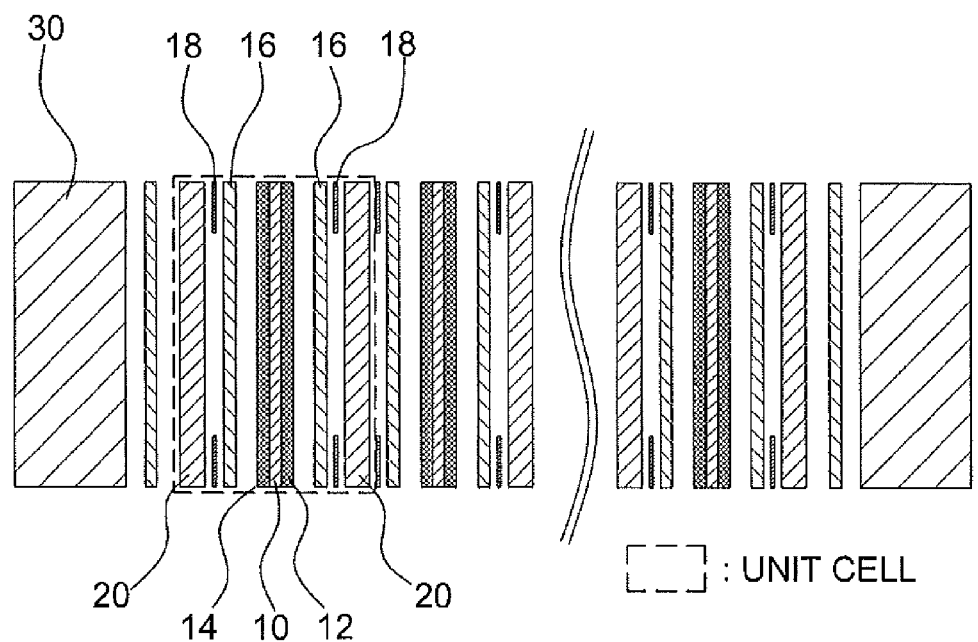
FIG. 3 is a schematic view illustrating a conventional configuration of a fuel cell stack.

To this end, as shown in FIGS. 1 and 2, a phosphor 50 is coated on a predetermined position of each MEA 100 and separation plate 20.

The MEA 100 includes a polymer electrolyte membrane 10 that enables hydrogen protons to move therethrough, and catalyst layers, i.e., a cathode 12 and an anode 14, respectively coated on both surfaces of the electrolyte membrane 10 so that hydrogen and oxygen can react to each other. Thus, hydrogen and air flow fields 102 and 104 that guide gas flow to the cathode 12 and the cathode 14 by allowing the gas flow of air, hydrogen, etc. are formed at both sides of each of the cathode 12 and the anode 14. A coolant flow field 106 for stack cooling is formed to pass therethrough between the hydrogen and air flow fields 102 and 106. The coolant within the coolant flow field may be for example, ionized water or any other coolant having a high degree of thereto conductivity.

Here, a process of coating the phosphor 50 on a corner position in the diagonal direction of the MEA 100 is performed together with the process of punching the gas and coolant flow fields 102, 104 and 106 including the hydrogen flow field 102, the air flow field 104 and the coolant flow field 106 at both sides of each of the cathode 12 and the anode 14 of the MEA 100. More specifically, the phosphor 50 is coated at a corner position in the diagonal direction of the MEA 100, preferably at a peripheral position of the gas and coolant flow fields 102, 104 and 106.

The phosphor 50 is also coated on the separation plate 20. Thus, the phosphor 50 is coated on a corner position in the diagonal direction of the separation plate 20, preferably at a peripheral position of gas and coolant manifolds 22, 24 and 26 of the separation plate 20, when the gas and coolant manifolds 22, 24 and 26 are punched during manufacturing the separation plate 20.

Meanwhile, a phosphor sensor 52 is configured and positioned to automatically sense the phosphor 50 coated on the MEA 100 or the separation plate 20. Preferably, the phosphor sensor is disposed above the stacked MEA 100 and the separation plate 20. The device according to the exemplary embodiment of the present invention further includes a controller (not shown) that determines whether the MEA 100 and the separation plate 20 have been stacked in a satisfactory or unsatisfactory manner based upon whether or not a sensing signal has been received from the phosphor sensor 52.

Hereinafter, the method for stacking the fuel cell stack configured as described above according to the embodiment of the present invention will be described.

The stacking and assembling between the MEA 100 and the separation plate 20 is performed in the state in which the phosphor 50 is coated at the peripheral position of the gas and coolant flow fields 102, 104 and 106 in the manufacturing of the MEA 100, and the phosphor 50 is coated at the peripheral position of the gas and coolant manifolds 22, 24 and 26 during the manufacturing of the separation plate 20.

When the separation plate 20 is stacked on the MEA 100, the phosphor sensor 52 senses the phosphor 50 coated on the MEA 100 when they are stacked appropriately. Subsequently, when the MEA 100 is stacked on the separation plate 20, the phosphor sensor 52 senses the phosphor 50 coated on the separation plate 20 when they are stacked appropriately. Then, the controller determines whether or not the MEA 100 and the separation plate 20 have been accurately stacked on each other.

That is, the controller determines that the gas and coolant flow fields 102, 104 and 106 including the hydrogen flow field 102, the air flow field 104 and the coolant flow field 106 of the MEA 100 exactly correspond to the gas and coolant flow fields 22, 24 and 25 including the hydrogen manifold 22, the air manifold 24 and the coolant manifold 26 of the separation plate 20, respectively based upon whether or not phosphor is detected by the phosphor sensor.

When, however, the phosphor sensor 52 does not sense the phosphor 50, the controller determines that the MEA 100 and the separation plate 20 have not been stacked in a satisfactory manner, and the controller provides a warning signal indicating that re-stacking must be preformed so that follow-up measures for re-stacking can be taken.

Thus, as the MEA 100, the separation plate 20, etc. are accurately stacked to one another, the gas and coolant flow fields 102, 104 and 106 of the MEA 100 and the gas and coolant manifolds 22, 24 and 26 of the separation plate 20 exactly correspond to each other, so that the airtightness by the gasket can be easily made. Therefore, it is possible to reduce the risk of leakage of the gas and coolant provided to the fuel cell stack and to implement uniform stack performance.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A device for stacking a fuel cell stack, comprising:
    phosphor coated at a predetermined position on a membrane-electrode assembly (MEA) and a separation plate, stacked on each other;
    a phosphor sensor positioned and configured to sense the phosphor on the stacked MEA and separation plate, the phosphor sensor disposed at an upper peripheral position above the MEA and the separation plate that have been stacked together; and
    a controller configured to determine whether the MEA and the separation plate have been stacked in a satisfactory or unsatisfactory manner, based on whether or not the controller has received a signal from the phosphor sensor.

2. The device of claim 1, wherein the phosphor is coated at a corner position in the diagonal direction of the MEA and at a corner position in the diagonal direction of the separation plate.

3. The device of claim 1, wherein the phosphor is formed at a peripheral position of gas and coolant flow fields of the MEA and a peripheral position of gas and coolant manifolds of the separation plate.

4. A method for stacking a fuel cell stack, comprising:
    coating phosphor at a corner position in the diagonal direction of a membrane-electrode assembly (MEA) while punching gas and coolant flow fields of in the MEA;
    coating phosphor at a corner position in the diagonal direction of a separation plate while punching gas and coolant manifolds in the separation plate;
    stacking the coated MEA and separator plate on each other; and
    determining, by a controller, that the MEA and the separation plate are stacked in a satisfactory manner, when a phosphor sensor senses phosphor on the stacked MEA and the separation plate.

5. The method of claim 4, further comprising providing a warning from the controller that the MEA and the separator plate have not been stacked in a satisfactory manner when the phosphor sensor does not sense the phosphor at the corner positions, wherein the warning indicates that the MEA and separator plate must be re-stacked.

* * * * *